US011970181B2

(12) United States Patent
Baek (10) Patent No.: US 11,970,181 B2
(45) Date of Patent: Apr. 30, 2024

(54) APPARATUS AND METHOD FOR ASSISTING IN DRIVING VEHICLE (71) Applicant: HL KLEMOVE CORP., Incheon (KR)

(72) Inventor: Hyunwoo Baek, Gyeonggi-do (KR)

(73) Assignee: HL KLEMOVE CORP., Incheon (KR)

( * ) Notice: Subject to any disclaimer, the term of this patent is extended or adjusted under 35 U.S.C. 154(b) by 0 days.

(21) Appl. No.: 17/940,293

(22) Filed: Sep. 8, 2022

(65) Prior Publication Data
US 2023/0089888 A1 Mar. 23, 2023

(30) Foreign Application Priority Data
Sep. 17, 2021 (KR) .................. 10-2021-0124998

(51) Int. Cl.
B60Q 1/00 (2006.01)
B60W 30/095 (2012.01)
B60W 50/14 (2020.01)

(52) U.S. Cl.
CPC ........ B60W 50/14 (2013.01); B60W 30/0956 (2013.01); B60W 2050/143 (2013.01); B60W 2050/146 (2013.01); B60W 2420/42 (2013.01); B60W 2420/52 (2013.01); B60W 2554/20 (2020.02); B60W 2554/80 (2020.02)

(58) Field of Classification Search
CPC ............. B60W 50/14; B60W 30/0956; B60W 2050/143; B60W 2050/146; B60W 2420/42; B60W 2420/52; B60W 2554/20; B60W 2554/80
USPC .......................... 340/438, 435, 436, 439, 903
See application file for complete search history.

(56) References Cited

U.S. PATENT DOCUMENTS

| | | | |
|---|---|---|---|
| 2020/0047746 A1* | 2/2020 | Ji ........................... | B60W 50/14 |
| 2020/0391731 A1* | 12/2020 | Cheon .................... | B60W 50/14 |
| 2021/0188318 A1* | 6/2021 | Lee ................... | B60W 30/0956 |
| 2021/0225169 A1* | 7/2021 | Baba ..................... | G06F 18/253 |
| 2021/0291836 A1* | 9/2021 | Cho ........................ | G08G 1/166 |
| 2021/0394754 A1* | 12/2021 | Takahashi ........... | B60W 30/095 |
| 2021/0394760 A1* | 12/2021 | Mielenz .......... | B60W 30/18154 |

FOREIGN PATENT DOCUMENTS

| | | |
|---|---|---|
| JP | 2009-208670 | 9/2009 |
| JP | 2021-94953 | 6/2021 |
| KR | 10-2012-0022485 | 3/2012 |
| KR | 10-1625406 | 5/2016 |

(Continued)

OTHER PUBLICATIONS

Office Action dated Jul. 25, 2023 for Korean Patent Application No. 10-2021-0124998 and its English translation from Global Dossier.

(Continued)

Primary Examiner — Anh V La
(74) Attorney, Agent, or Firm — Ladas & Parry, LLP (57) ABSTRACT Provided is an apparatus for assisting in driving a vehicle, the apparatus including: a camera installed in the vehicle to have a front field of view and configured to acquire image data; and a controller configured to process the image data, wherein the controller is configured to: detect a vehicle parked in a direction opposite to a driving direction of the vehicle, based on the processed image data, and when the parked vehicle is detected, generate a control signal for providing a notification to a driver.

18 Claims, 6 Drawing Sheets (56) References Cited

FOREIGN PATENT DOCUMENTS

KR    10-2019-0126416    11/2019
KR    10-2021-0108307    9/2021

OTHER PUBLICATIONS

Office Action dated Jan. 16, 2024 for Korean Patent Application No. 10-2021-0124998 and its English translation from Global Dossier.

* cited by examiner

APPARATUS AND METHOD FOR ASSISTING IN DRIVING VEHICLE

CROSS-REFERENCE TO RELATED APPLICATION

This application is based on and claims priority under 35 U.S.C. § 119 to Korean Patent Application No. 10-2021-0124998, filed on Sep. 17, 2021 in the Korean Intellectual Property Office, the disclosure of which is incorporated herein by reference.

BACKGROUND

1. Technical Field

The disclosure relates to an apparatus and method for assisting in driving a vehicle, and more specifically, to an apparatus and method for assisting in driving a vehicle that may identify a movement of a vehicle parked in a direction opposite to a driving direction of the vehicle.

2. Background Art

As the most common means of transportation in modern society, the number of people using vehicles is increasing. Although the development of vehicle technology has the advantage of making long-distance travel easier and living more conveniently, traffic congestion often occurs in places with high population density such as South Korea.

A lot of research on a vehicle equipped with an advanced driver assistance system (ADAS) that actively provides information about a vehicle state, a driver state and traffic environment has been recently carried out to reduce drivers' burden and improve convenience.

For example, ADAS may provide functions such as a forward collision avoidance (FCA), an autonomous emergency braking (AEB), a driver attention warning (DAW), and the like. Such systems are for avoiding collision and providing warning by determining a risk of collision with an object during driving and performing emergency braking.

SUMMARY

An aspect of the disclosure provides an apparatus and method for assisting in driving a vehicle that may determine a vehicle parked in a direction opposite to a driving direction of the vehicle and analyze a movement of the parked vehicle, thereby reducing a risk of collision with the vehicle.

Additional aspects of the disclosure will be set forth in part in the description which follows and, in part, will be obvious from the description, or may be learned by practice of the disclosure.

According to an aspect of the disclosure, there is provided an apparatus for assisting in driving a vehicle, the apparatus including: a camera installed in the vehicle to have a front field of view and configured to acquire image data; and a controller configured to process the image data, wherein the controller is configured to: detect a vehicle parked in a direction opposite to a driving direction of the vehicle, based on the processed image data, and when the parked vehicle is detected, generate a control signal for providing a notification to a driver.

The apparatus further includes a sensor including at least one of a radar sensor or a lidar sensor and configured to generate sensing information about a front of the vehicle, wherein the controller is configured to: process the sensing information; and detect a movement of the vehicle parked in the direction opposite to the driving direction of the vehicle, further based on the processing of the sensing information.

When the movement of the vehicle parked in the direction opposite to the driving direction of the vehicle is detected, the controller is configured to calculate a predicted path of the parked vehicle based on at least one of a driving direction, an angle or a speed of the parked vehicle.

The controller is configured to calculate a time to collision (TTC) between the vehicle and the parked vehicle, based on the calculated predicted path of the parked vehicle.

When the calculated TTC is less than a predetermined period of time, the controller is configured to provide the notification to the driver and generate a control signal for performing emergency braking of the vehicle.

When the calculated TTC is greater than or equal to a predetermined period of time, the controller is configured to generate a control signal for performing an existing control.

According to an aspect of the disclosure, there is provided a method for assisting in driving a vehicle, the method including: acquiring image data by a camera installed in the vehicle to have a front field of view; detecting a vehicle parked in a direction opposite to a driving direction of the vehicle, based on the image data; and when the parked vehicle is detected, controlling to provide a notification to a driver.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Like reference numerals throughout the specification denote like elements. Also, this specification does not describe all the elements according to embodiments of the disclosure, and descriptions well-known in the art to which the disclosure pertains or overlapped portions are omitted. The terms such as "~part", "~member", "~module", "~block", and the like may refer to at least one process processed by at least one hardware or software. According to embodiments, a plurality of "~part", "~member", "~module", "~block" may be embodied as a single element, or a single of "~part", "~member", "~module", "~block" may include a plurality of elements.

It will be understood that when an element is referred to as being "connected" to another element, it can be directly or indirectly connected to the other element, wherein the indirect connection includes "connection" via a wireless communication network.

It will be understood that the term "include" when used in this specification, specifies the presence of stated features, integers, steps, operations, elements, and/or components, but do not preclude the presence or addition of one or more other features, integers, steps, operations, elements, components, and/or groups thereof.

It will be understood that when it is stated in this specification that a member is located "on" another member, not only a member may be in contact with another member, but also still another member may be present between the two members.

It will be understood that, although the terms first, second, etc. may be used herein to describe various elements, these elements should not be limited by these terms.

It is to be understood that the singular forms are intended to include the plural forms as well, unless the context clearly dictates otherwise.

Reference numerals used for method steps are just used for convenience of explanation, but not to limit an order of the steps. Thus, unless the context clearly dictates otherwise, the written order may be practiced otherwise.

Hereinafter, an operation principle and embodiments will be described in detail with reference to the accompanying drawings.

Figure 1:
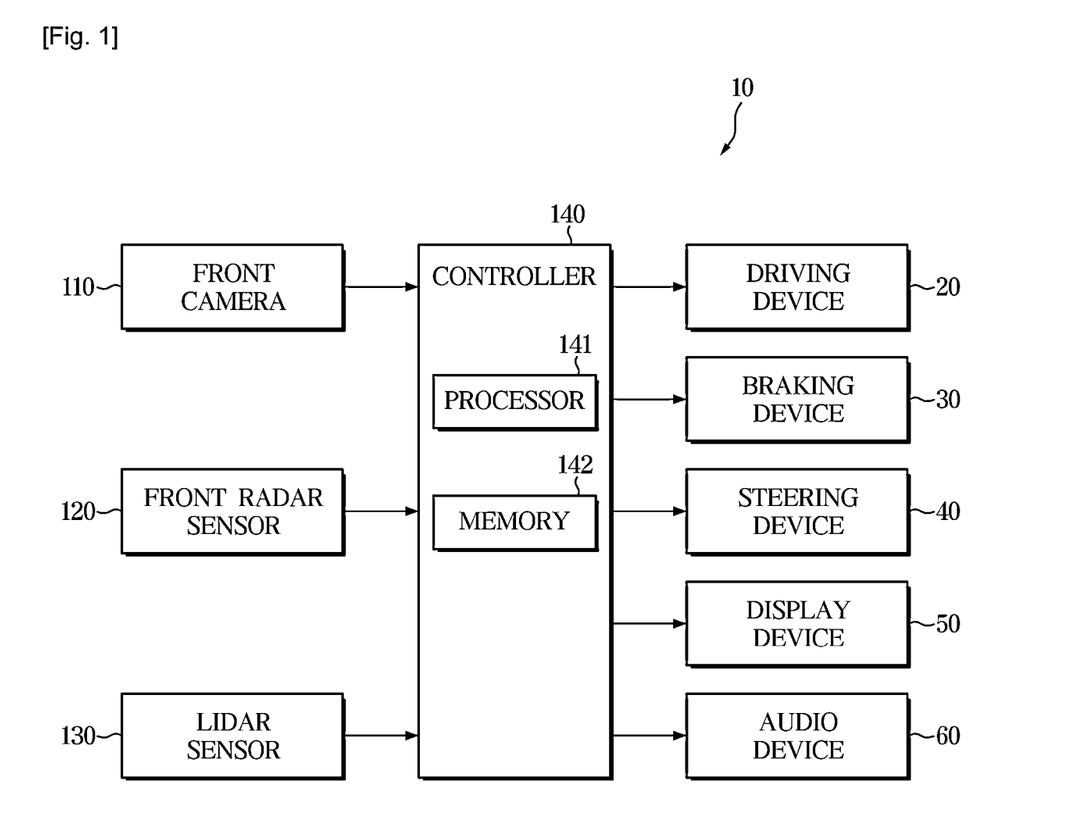
FIG. 1 is a control block diagram illustrating a vehicle and an apparatus for assisting in driving the vehicle according to an embodiment.
Figure 2:
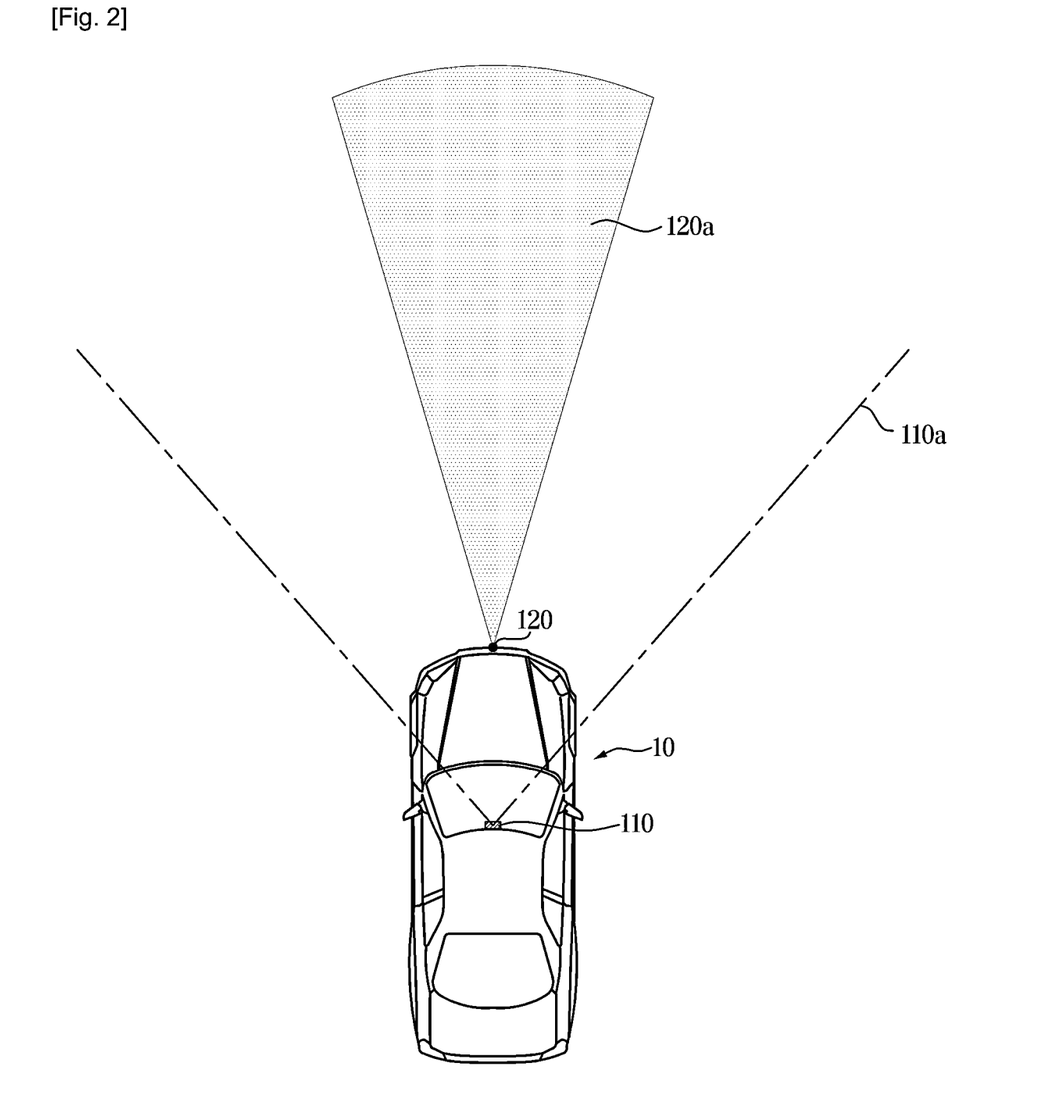
FIG. 2 illustrates fields of view of cameras and radars of an apparatus for assisting in driving a vehicle according to an embodiment.

FIG. 1 is a control block diagram illustrating a vehicle and an apparatus for assisting in driving the vehicle according to an embodiment. FIG. 2 illustrates fields of view of cameras and radars of an apparatus for assisting in driving a vehicle according to an embodiment.

As shown in FIG. 1, a vehicle 10 includes a driving device 20, a braking device 30, a steering device 40, a display device 50, an audio device 60, a front camera 110, a front radar sensor 120, a light detection and ranging (lidar) sensor 130 and a controller 140. The above constituent components may communicate with each other via a vehicle communication network (NT). For example, the electronic devices 20, 30, 40, 50, 60 included in the vehicle 10 may transmit and receive data with each other through Ethernet, media oriented systems transport (MOST), FlexRay, controller area network (CAN), local interconnect network (LIN), and the like.

The driving device 20 may move the vehicle 10 and include an engine, an engine management system (EMS), a transmission, and a transmission control unit (TCU). The engine may generate power for driving the vehicle 10. The EMS may control the engine in response to a driver's acceleration intention through an accelerator pedal or a request from the controller 140. The transmission may decelerate and transmit the power generated by the engine to vehicle wheels. The TCU may control the transmission in response to a driver's shift command through a shift lever and/or a request from the controller 140.

The braking device 30 may stop the vehicle 10 and include a brake caliper and an electronic brake control module (EBCM). The brake caliper may decelerate or stop the vehicle 10 using friction with a brake disc. The EBCM may control the brake caliper in response to a driver's braking intention through a brake pedal and/or a request from the controller 140. For example, the EBCM may receive a deceleration request including a deceleration from the controller 140, and control the brake caliper electrically or hydraulically to decelerate the vehicle 10 based on the requested deceleration.

The steering device 40 may include an electronic power steering control module (EPS). The steering device 40 may change a driving direction of the vehicle 10. The EPS may assist operations of the steering device 40 so that a driver may easily manipulate a steering wheel according to a driver's steering intention. The EPS may also control the steering device 40 in response to a request from the controller 140. For example, the EPS may receive a steering request including a steering torque from the controller 140, and control the steering device 40 to steer the vehicle 10 based on the requested steering torque.

The display device 50 may include a cluster, a head-up display, a center fascia monitor, etc., and provide a driver with various information and entertainment through images and sounds. For example, the display device 50 may provide the driver with travel information of the vehicle 10, route information to a destination, a warning message, and the like.

The audio device 60 may include a plurality of speakers, and provide a driver with various information and entertainment through sounds. For example, the audio device 60 may provide the driver with travel information of the vehicle 10, route information to a destination, a warning message, and the like.

The front camera 110, the front radar sensor 120, the lidar sensor 130 and the controller 140 may integrally assist the driving of the vehicle 10. For example, the front camera 110, the front radar sensor 120, the lidar sensor 130 and the controller 140 may integrally provide functions such as a lane departure warning (LDW), a lane keeping assist (LKA), a high beam assist (HBA), an autonomous emergency braking (AEB), a traffic sign recognition (TSR), an adaptive cruise control (ACC), a blind spot detection (BSD), and the like.

The front camera 110, the front radar sensor 120, the lidar sensor 130 and the controller 140 may be provided to be separated from each other. For instance, the controller 140 may be installed in a housing separated from a housing of the front camera 110, a housing of the front radar sensor 120 and a housing of the lidar sensor 130. The controller 140 may transmit and receive data with the front camera 110, the front radar sensor 120 or the lidar sensor 130 over a broadband network.

As shown in FIG. 2, the front camera 110 may have a field of view 110a facing the front of the vehicle 10. For example, the front camera 110 may be installed on a front windshield of the vehicle 10, without being limited thereto.

The front camera 110 may include a plurality of lens and image sensors. The image sensor may include a plurality of photodiodes converting light into an electrical signal, and the plurality of photodiodes may be arranged in a two-dimensional (2D) matrix.

The front camera 110 may photograph the front of the vehicle 10, and acquire image data on the front of the vehicle 10. The image data on the front of the vehicle 10 may include information about other vehicles, pedestrians, cyclists, or lane lines (markers distinguishing lanes on a road) located in front of the vehicle 10. Also, the image data on the front of the vehicle 10 may include information about a free space where the vehicle 10 is capable of travelling.

The front camera 110 may be electrically connected to the controller 140. For example, the front camera 110 may be connected to the controller 140 via a vehicle communication network (NT) or a hard wire. The front camera 110 may transmit the image data on the front of the vehicle 10 to the controller 140.

The controller 140 may process the image data received from the front camera 110, and identify another vehicle, pedestrian, cyclist, lane line (marker distinguishing lanes on a road), or free space located in front of the vehicle 10, from the image data.

As shown in FIG. 2, the front radar sensor 120 may have a field of sensing 120*a* facing the front of the vehicle 10. For example, the front radar sensor 120 may be installed in a grille or a bumper of the vehicle 10.

The front radar sensor 120 may include a transmission antenna (or a transmission antenna array) that transmits a transmission wave toward the front of the vehicle 10, and a receiving antenna (or a receiving antenna array) that receives a reflected wave reflected from an object. The front radar sensor 120 may acquire radar data from the transmission wave transmitted by the transmission antenna and the reflected wave received by the receiving antenna. The radar data may include relative positions and relative speeds of other vehicles, pedestrians or cyclists located in front of the vehicle 10. The front radar sensor 120 may calculate a relative distance to an object based on a phase difference (or a time difference) between the transmission wave and the reflected wave, and calculate a relative speed of the object based on a frequency difference between the transmission wave and the reflected wave.

For example, the front radar sensor 120 may be connected to the controller 140 via a vehicle communication network (NT), a hard wire, or a printed circuit board (PCB). The front radar sensor 120 may transmit the radar data to the controller 140.

The controller 140 may process the radar data received from the front radar sensor 120, and identify the relative positions and relative speeds of other vehicles, pedestrians or cyclists located in front of the vehicle 10, from the radar data.

For example, the lidar sensor 130 may have fields of view facing all directions around the vehicle 10, and be installed on a roof of the vehicle 10.

The lidar sensor 130 may include a light source (e.g., a light emitting diode (LED) or a LED array, a laser diode or a laser diode array) that emits light (e.g., infrared rays) and a light receiver (e.g., a photodiode or a photodiode array) that receives the light reflected by an object. Also, when required, the lidar sensor 130 may further include a driving device for rotating the light source and the light receiver. While rotating, the lidar sensor 130 may receive lidar data by emitting light and receiving the light reflected from an object. The lidar data may include relative positions and relative speeds of other vehicles, pedestrians or cyclists around the vehicle 10.

For example, the lidar sensor 130 may be connected to the controller 140 via a vehicle communication network (NT), a hard wire, or a PCB. The lidar sensor 130 may transmit the lidar data to the controller 140.

The controller 140 may process the lidar data received from the lidar sensor 130, and identify the relative positions and relative speeds of other vehicles, pedestrians, or cyclists around the vehicle 10, from the lidar data.

The controller 140 may be electrically connected to the front camera 110, the front radar sensor 120, and the lidar sensor 130. Also, the controller 140 may be connected to the driving device 20, the braking device 30, the steering device 40, the display device 50 and the audio device 60 via a vehicle communication network (NT).

The controller 140 may include a processor 141 and a memory 142.

The processor 141 may process the image data, the radar data and the lidar data, and output a driving signal, a braking signal, a steering signal and a warning signal for controlling the driving device 20, the braking device 30, the steering device 40, the display device 50 and the audio device 60, respectively. For example, the processor 141 may include an image processor, a digital signal processor (DSP), and/or a micro control unit (MCU).

The processor 141 may identify objects around the vehicle 10 (e.g., other vehicles, pedestrians, cyclists, etc.), lanes, and free space based on the image data, the radar data and the lidar data.

Based on the image data, the processor 141 may identify the relative positions (a distance from the vehicle 10 and an angle to a driving direction) of front objects of the vehicle 10 and classify the front objects (e.g., whether the front object is another vehicle, a pedestrian, or a cyclist). Also, based on the radar data and the lidar data, the processor 141 identify the relative positions and relative speeds of the front objects of the vehicle 10. In addition, the processor 141 may match objects identified based on the radar data with objects identified based on the image data and objects identified based on the lidar data, and based on results of matching, acquire the relative positions and relative speeds of the objects around the vehicle 10 and classify the objects around the vehicle 10.

The processor 141 may estimate a position of the vehicle 10 using the image data, the radar data, the lidar data, and a high-definition map (HD map) stored in the memory 142. For example, based on the lidar data, the processor 141 may identify distances to a plurality of landmarks on the HD map, and identify an absolute position of the vehicle 10 based on the distances to the plurality of landmarks.

Based on the image data, the radar data and the lidar data, the processor 141 may project the objects around the vehicle 10 on the HD map. The processor 141 may project the objects around the vehicle 10 on the HD map based on the absolute position of the vehicle 10 and the relative positions of the objects.

Based on the image data acquired from the front camera 110, the radar data acquired from the front radar sensor 120, and the lidar data acquired from the lidar sensor 130, the processor 141 may identify a vehicle parked in a direction opposite to a driving direction of the vehicle 10, and detect a movement of the parked vehicle.

More specifically, the processor 141 may calculate a time to collision (TTC) between the vehicle 10 and the parked vehicle from a movement of the parked vehicle, and when the TTC is less than a predetermined period of time, provide a driver with a notification and generate a control signal for controlling the braking device 30 to perform emergency braking.

Also, the processor 141 may calculate a TTC between the vehicle 10 and the parked vehicle from a movement of the parked vehicle, and when the TTC is greater than or equal to the predetermined period of time, generate a control signal for controlling the driving device 20 to perform an existing control.

According to another embodiment, the processor 141 may identify a vehicle parked in a direction opposite to a driving direction of the vehicle 10, detect a movement of the parked vehicle, calculate a TTC between the vehicle 10 and the parked vehicle, and generate a control signal for controlling the driving device 20, the braking device 30, the steering device 40, the display device 50 and the audio device 60 of the vehicle 10, based on the calculated TTC.

The memory 142 may store a program and/or data for the processor 141 to process the image data, a program and/or data for the processor 141 to process the radar data, and a program and/or data for the processor 141 to generate a driving signal and/or a braking signal and/or a steering signal. Also, the memory 142 may store the HD map.

The memory 142 may temporarily store the image data received from the front camera 110, the radar data received from the front radar sensor 120, and a processing result of the image data and/or the radar data by the processor 141.

The memory 142 may include a volatile memory such as a static random access memory (S-RAM) and dynamic random access memory (D-RAM), and a non-volatile memory such as a flash memory, a read only memory (ROM), an erasable programmable read only memory (EPROM), and the like.

As such, based on the image data received from the front camera 110, the radar data received from the front radar sensor 120, and the lidar data received from the lidar sensor 130, the controller 140 may transmit the driving signal to the driving device 20, the braking signal to the braking device 30, or the steering signal to the steering device 40.

Figure 3:
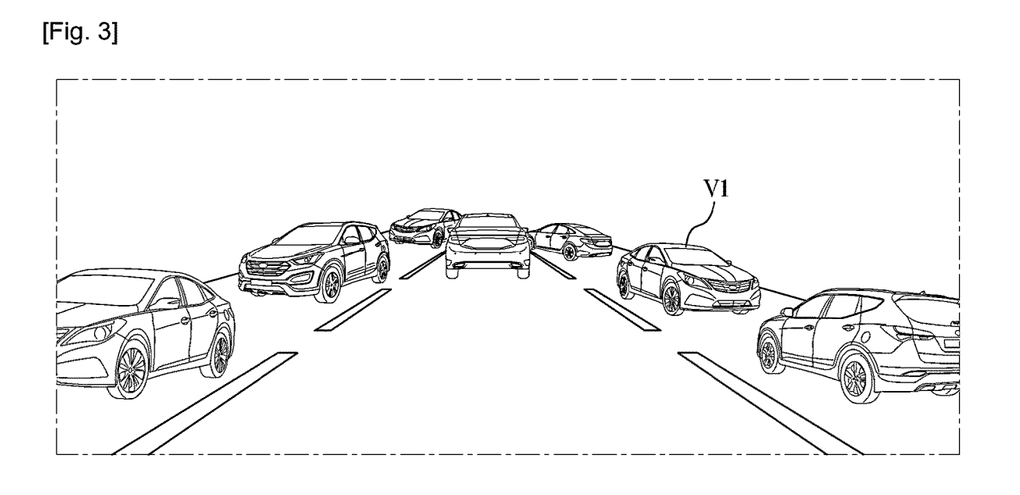
FIG. 3 is a conceptual diagram illustrating image data acquired from a camera of an apparatus for assisting in driving a vehicle according to an embodiment.

FIG. 3 is a conceptual diagram illustrating image data acquired from a camera of an apparatus for assisting in driving a vehicle according to an embodiment.

Referring to FIG. 3, vehicles are parked on a right side of a driving path of the vehicle 10.

With respect to a vehicle V1 parked in a direction opposite to a driving direction of the vehicle 10 among the parked vehicles, a collision between the vehicle 10 and the parked vehicle V1 is likely to occur when the parked vehicle V1 starts moving to release parking.

In order to prevent the collision between the vehicle 10 and the parked vehicle V1, identifying the vehicle V1 parked in the direction opposite to the driving direction of the vehicle 10 in advance and detecting a movement of the parked vehicle V1 to calculate a TTC to the vehicle 10 are required.

Hereinafter, an operation of identifying whether a direction of a parked vehicle is opposite to the driving direction of the vehicle 10 is described.

In general, lamps for emitting light are mounted in front of and at a rear of a vehicle. A tale lamp mounted at the rear of the vehicle should be obliged to emit red light.

The front camera 110 of the vehicle 10 may identify red light. Accordingly, when a lamp of a parked vehicle emits red light in an image recognized by the front camera 110, the controller 140 may determine that the parked vehicle is in the same direction as the driving direction of the vehicle 10.

By contrast, when a lamp of a parked vehicle does not emit red light in the image recognized by the front camera 110, the controller 140 may determine that the parked vehicle is in a direction opposite to the driving direction of the vehicle 10. That is, the controller 140 may identify that the parked vehicle faces the driving direction of the vehicle 10.

As such, when the vehicle V1 parked in the direction opposite to the driving direction of the vehicle 10 is detected based on image data, a notification for notifying a driver of a presence of the parked vehicle V1 may be provided.

The notification may be provided to the driver as an image through the display device 50 or a sound through the audio device 60.

Figure 4:
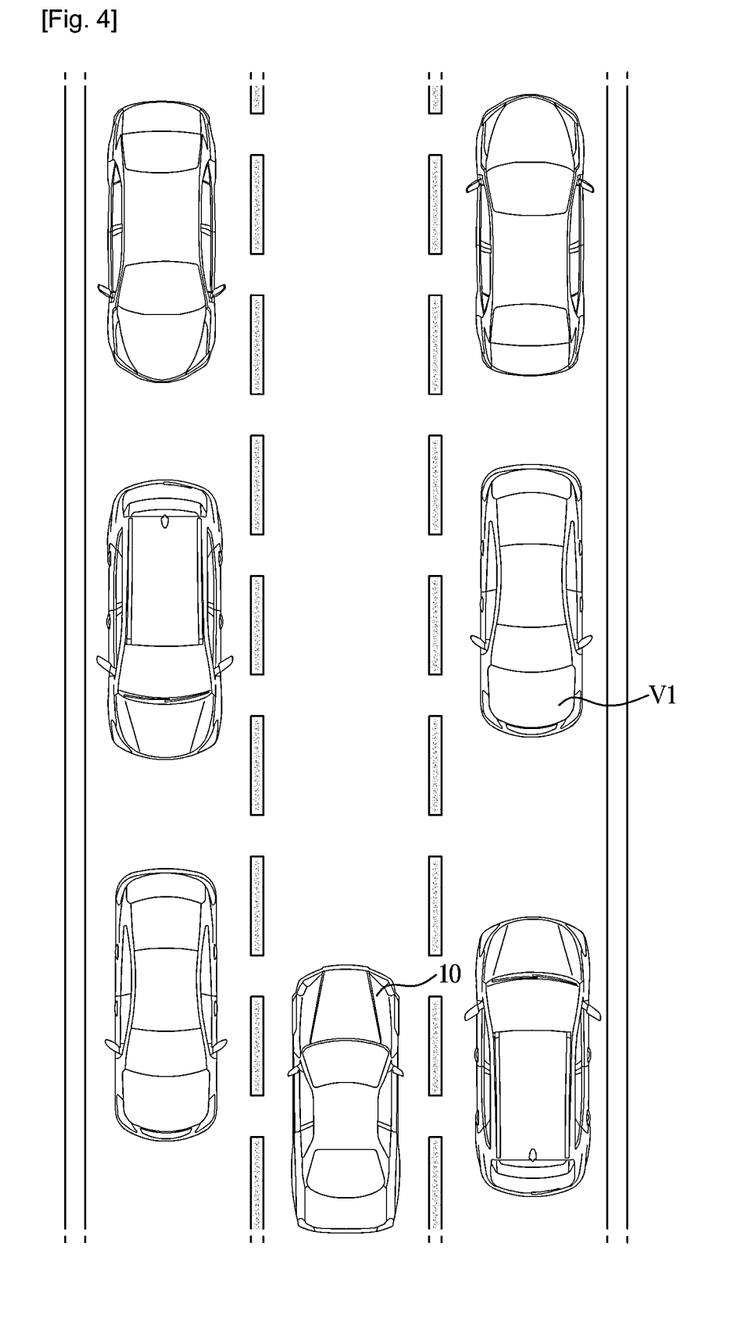
FIG. 4 is a conceptual diagram illustrating an example where vehicles are parked in a direction opposite to a driving direction of a vehicle according to an embodiment.
Figure 5:
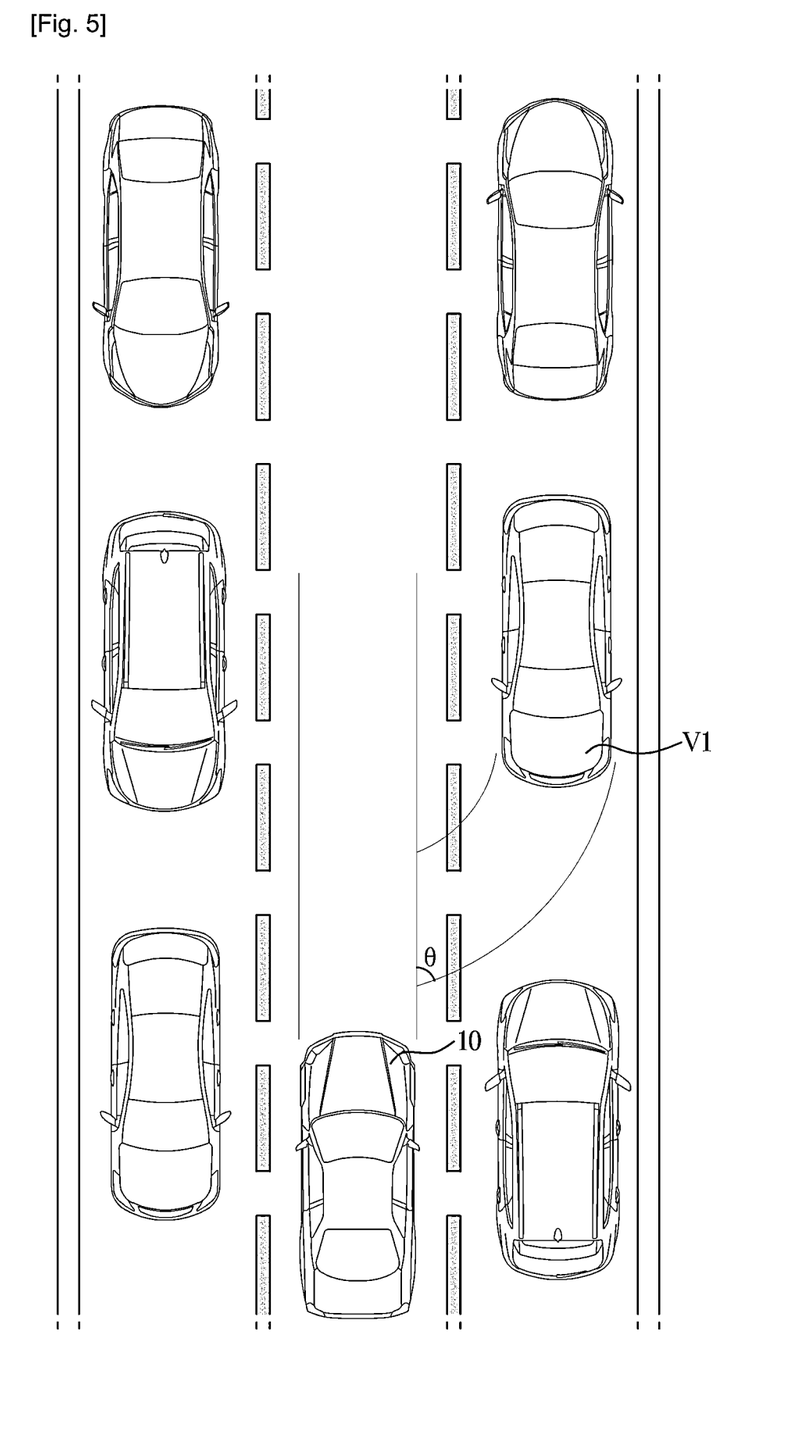
FIG. 5 is a conceptual diagram illustrating an example where a vehicle parked in a direction opposite to a driving direction of a vehicle according to an embodiment moves.

FIG. 4 is a conceptual diagram illustrating an example where the vehicle V1 is parked in a direction opposite to a driving direction of the vehicle 10. FIG. 5 is a conceptual diagram illustrating an example where the vehicle V1 parked in a direction opposite to a driving direction of the vehicle 10 moves.

Referring to FIG. 4, the vehicle 10 may detect the vehicle V1 parked in a direction opposite to a driving direction of the vehicle 10. The operation of identifying a direction of a parked vehicle has been described above.

When the vehicle V1 parked in the direction opposite to the driving direction of the vehicle 10 is detected, the controller 140 may generate a control signal for providing a driver with a notification to notify of a presence of the parked vehicle V1.

Referring to FIG. 5, the vehicle V1 parked in the direction opposite to the driving direction of the vehicle 10 may start moving to release parking.

In this instance, the vehicle 10 may generate sensing information about a front of the vehicle 10 through at least one of the front radar sensor 120 or the lidar sensor 130, and the controller 140 may process the sensing information and detect a movement of the vehicle V1 parked in the direction opposite to the driving direction of the vehicle 10 based on the processed sensing information.

When the movement of the vehicle V1 parked in the direction opposite to the driving direction of the vehicle 10 is detected, the controller 140 may perform control to calculate a predicted path of the vehicle V1.

Specifically, the controller 140 may acquire information about at least one of a driving direction, an angle, or a speed of the parked vehicle V1, and calculate the predicted path of the parked vehicle V1 based on the acquired information.

When the predicted path of the parked vehicle V1 is calculated, the controller 140 may calculate a TTC between the vehicle 10 and the parked vehicle V1 based on the calculated predicted path.

When the calculated TTC is less than a predetermined period of time, the controller 140 may provide a driver with a notification and generate a control signal for controlling the braking device 30 for emergency braking of the vehicle 10.

The notification may be provided to the driver in a form of image through the display device 50 or sound through the audio device 60.

Through the emergency braking control, a risk of collision between the vehicle 10 and the parked vehicle V1 due to a sudden movement of the parked vehicle V1 may be reduced.

By contrast, when the calculated TTC is greater than or equal to the predetermined period of time, the controller 140 may generate a control signal for performing an existing control.

That is, because a risk of collision between the vehicle 10 and the parked vehicle V1 does not exist, an existing operation is performed.

As described above, when the vehicle V1 parked in the direction opposite to the driving direction of the vehicle 10 is detected and a movement of the parked vehicle V1 is detected, the controller 140 may calculate the predicted path of the parked vehicle V1 based on at least one of the driving direction, the angle, or the speed of the parked vehicle V1.

The TTC between the vehicle 10 and the parked vehicle V1 may be calculated based on the calculated predicted path, and be compared with the predetermined period of time, and thus controls are performed differently depending on results of the comparison. Accordingly, a risk of collision may be reduced.

Figure 6:
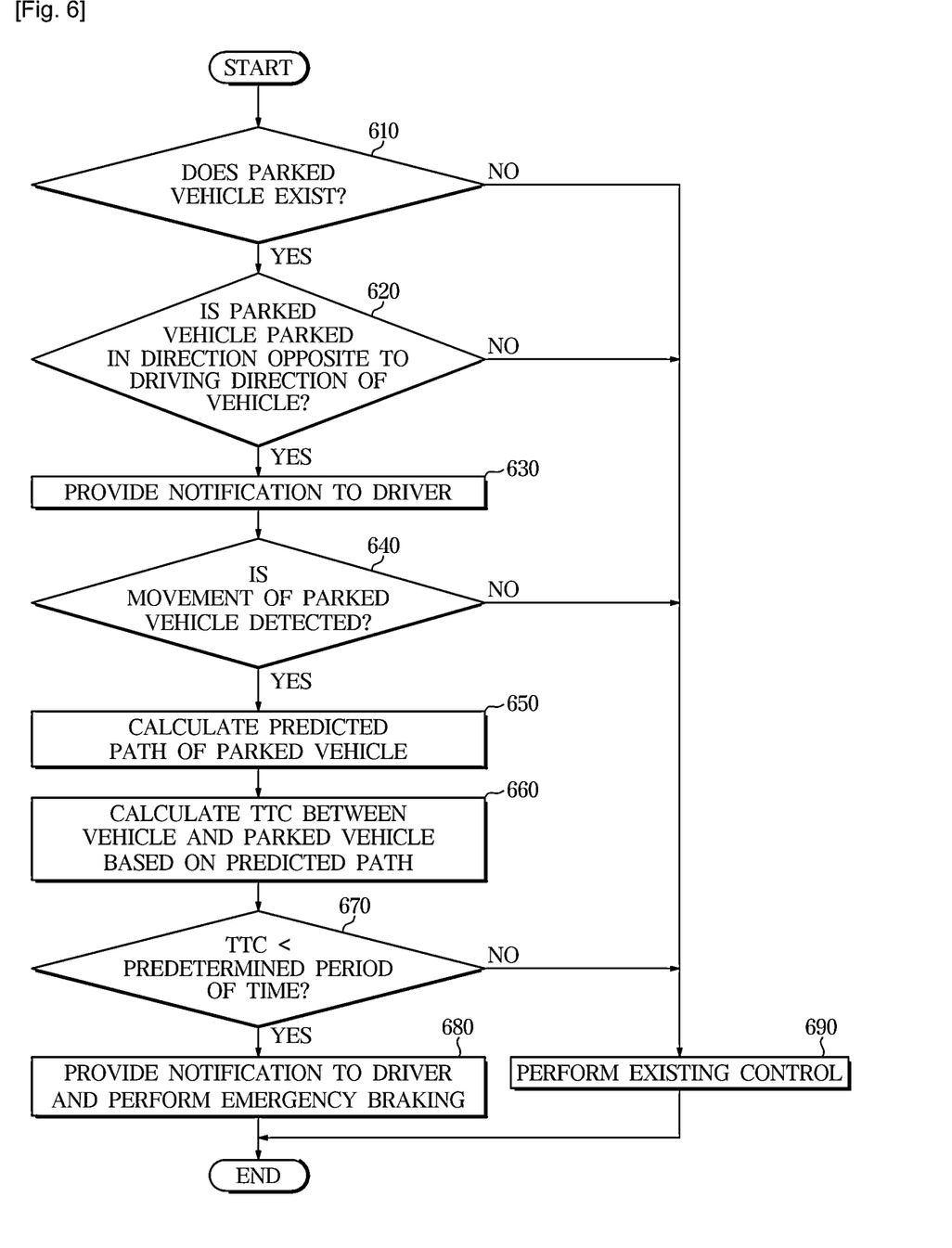
FIG. 6 is a flowchart illustrating a method for assisting in driving a vehicle according to an embodiment.

FIG. 6 is a flowchart illustrating a method for assisting in driving a vehicle according to an embodiment.

Referring to FIG. 6, the vehicle 10 may recognize whether a parked vehicle exists around a driving path of the vehicle 10 through the front camera 110 (610).

When a parked vehicle exists around the driving path of the vehicle 10 (Yes in operation 610), whether the parked vehicle is parked in a direction opposite to a driving direction of the vehicle 10 may be identified (620).

In this instance, a direction of the parked vehicle may be identified by recognizing a color of a lamp of the parked vehicle, as described above.

When the direction of the parked vehicle is in the direction opposite to the driving direction of the vehicle 10 (Yes in operation 620), a notification for notifying a driver of a presence of the vehicle V1 parked in the direction opposite to the driving direction of the vehicle 10 may be provided to the driver (630).

When the vehicle V1 parked in the direction opposite to the driving direction of the vehicle 10 is detected and the parked vehicle V1 starts moving to release parking, the movement may be detected (640).

When the movement of the parked vehicle V1 is detected (Yes in operation 640), a predicted path of the parked vehicle V1 may be calculated based on at least one of a driving direction, an angle or a speed of the parked vehicle V1 (650).

Based on the calculated predicted path of the parked vehicle V1, a TTC between the vehicle 10 and the parked vehicle V1 may be calculated (660).

By comparing the calculated TTC and a predetermined period of time, when the TTC is less than the predetermined period of time (Yes in operation 670), a notification may be provided to the driver and a control for emergency braking of the vehicle 10 may be performed (680).

By comparing the calculated TTC and a predetermined period of time, when the TTC is greater than or equal to the predetermined period of time (No in operation 670), a control may be performed to maintain an existing operation (690).

Also, when no parked vehicle exists around the driving path of the vehicle 10 (No in operation 610), the direction of the parked vehicle is in the same direction as the driving direction of the vehicle 10 (No in operation 620), or the movement of the parked vehicle V1 is not detected (No in operation 640), a control may be performed to maintain an existing operation.

As is apparent from the above, according to the embodiments of the disclosure, the apparatus and method for assisting in driving a vehicle can detect a vehicle parked in a direction opposite to a driving direction of the vehicle and predict a movement of the parked vehicle, thereby reducing a risk of collision with the vehicle.

Embodiments can thus be implemented in the form of a recording medium storing computer-executable instructions that are executable by a processor. The instructions may be stored in the form of a program code, and when executed by a processor, the instructions may generate a program module to perform operations of the disclosed embodiments. The recording medium may be implemented non-transitory as a computer-readable recording medium.

The computer-readable code can be recorded on a medium or transmitted through the Internet. The medium may include read only memory (ROM), random access memory (RAM), magnetic tapes, magnetic disks, flash memories, and optical recording medium.

Although embodiments have been described for illustrative purposes, those skilled in the art will appreciate that various modifications, additions and substitutions are possible, without departing from the scope and spirit of the disclosure. Therefore, embodiments have not been described for limiting purposes.

What is claimed is:

1. An apparatus for assisting in driving a host vehicle, the apparatus comprising:
a camera installed in the host vehicle to have a front field of view and configured to acquire image data; and
a controller configured to process the image data,
wherein the controller is configured to:
detect an other vehicle parked in a direction opposite to a driving direction of the host vehicle based on the processed image data, and
when the other vehicle parked in the direction opposite to the driving direction of the host vehicle is detected, generate a control signal for providing a notification for notifying a driver of a presence of the other vehicle parked in the direction opposite to the driving direction of the host vehicle.

2. The apparatus of claim 1, wherein the controller is configured to recognize a color of a lamp of the other vehicle parked in the direction opposite to the driving direction of the host vehicle based on the processed image data, and determine a direction of the other vehicle parked in the direction opposite to the driving direction of the host vehicle based on the recognized color.

3. The apparatus of claim 2, further comprising:
a sensor comprising at least one of a radar sensor or a lidar sensor and configured to generate sensing information about a front of the host vehicle,
wherein the controller is configured to:
process the sensing information; and
detect a movement of the other vehicle parked in the direction opposite to the driving direction of the host vehicle, further based on the processing of the sensing information.

4. The apparatus of claim 3, wherein, when the movement of the other vehicle parked in the direction opposite to the driving direction of the host vehicle is detected, the controller is configured to calculate a predicted path of the other vehicle parked in the direction opposite to the driving direction of the host vehicle based on at least one of a driving direction, an angle or a speed of the other vehicle parked in the direction opposite to the driving direction of the host vehicle.

5. The apparatus of claim 4, wherein the controller is configured to calculate a time to collision (TTC) between the host vehicle and the other vehicle, parked in the direction opposite to the driving direction of the host vehicle, based on the calculated predicted path of the other vehicle parked in the direction opposite to the driving direction of the host vehicle.

6. The apparatus of claim 5, wherein, when the calculated TTC is less than a predetermined period of time, the controller is configured to provide the notification to the driver and generate a control signal for performing emergency braking of the host vehicle.

7. The apparatus of claim 5, wherein, when the calculated TTC is greater than or equal to a predetermined period of time, the controller is configured to generate a control signal for performing an existing control.

8. The apparatus of claim 1, wherein the controller is configured to detect a parked direction of each of one or more parked vehicles in the image data.

9. The apparatus of claim 1, wherein the controller is configured to determine whether one or more parked vehicles in the image data are parked in the direction opposite to the driving direction of the host vehicle.

10. A method for assisting in driving a host vehicle, the method comprising:
acquiring image data by a camera installed in the host vehicle to have a front field of view;
detecting an other vehicle parked in a direction opposite to a driving direction of the host vehicle based on the image data; and
when the other vehicle parked in the direction opposite to the driving direction of the host vehicle is detected, controlling to provide a notification for notifying a driver of a presence of the other vehicle parked in the direction opposite to the driving direction of the host vehicle.

11. The method of claim 10, further comprising:
recognizing a color of a lamp of the other vehicle parked in the direction opposite to the driving direction of the host vehicle based on the image data; and
determining a direction of the other vehicle parked in the direction opposite to the driving direction of the host vehicle based on the recognized color.

12. The method of claim 11, further comprising:
generating, by at least one of a radar sensor or a lidar sensor, sensing information about a front of the host vehicle,
processing the sensing information; and
detecting a movement of the other vehicle parked in the direction opposite to the driving direction of the host vehicle, further based on the processing of the sensing information.

13. The method of claim 12, further comprising:
when the movement of the other vehicle parked in the direction opposite to the driving direction of the host vehicle is detected, calculating a predicted path of the other vehicle, parked in the direction opposite to the driving direction of the host vehicle, based on at least one of a driving direction, an angle or a speed of the other vehicle parked in the direction opposite to the driving direction of the host vehicle.

14. The method of claim 13, further comprising:
calculating a TTC between the host vehicle and the other vehicle, parked in the direction opposite to the driving direction of the host vehicle, based on the calculated predicted path of the other vehicle parked in the direction opposite to the driving direction of the host vehicle.

15. The method of claim 14, further comprising:
when the calculated TTC is less than a predetermined period of time, providing the notification to the driver and controlling the host vehicle to perform emergency braking of the host vehicle.

16. The method of claim 14, further comprising:
when the calculated TTC is greater than or equal to a predetermined period of time, controlling the host vehicle to perform an existing control.

17. The method of claim 10, further comprising detecting a parked direction of each of one or more parked vehicles in the image data.

18. The method of claim 10, further comprising determining whether one or more parked vehicles in the image data are parked in the direction opposite to the driving direction of the host vehicle.

* * * * *